(12) United States Patent
Lee

(10) Patent No.: US 7,538,802 B2
(45) Date of Patent: May 26, 2009

(54) METHOD OF CONTROLLING DIGITAL PHOTOGRAPHING APPARATUS TO INCREASE BRIGHTNESS DETECTABLE RANGE AND DIGITAL PHOTOGRAPHING APPARATUS ADOPTING THE METHOD

(75) Inventor: Seok-goun Lee, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 875 days.

(21) Appl. No.: 11/085,689

(22) Filed: Mar. 21, 2005

(65) Prior Publication Data

US 2006/0050171 A1    Mar. 9, 2006

(30) Foreign Application Priority Data

Sep. 9, 2004    (KR)    .................... 10-2004-0072085

(51) Int. Cl.
*H04N 5/235* (2006.01)
*H04N 5/225* (2006.01)
(52) U.S. Cl. ................... 348/229.1; 348/218.1
(58) Field of Classification Search .............. 348/229.1, 348/218.1
See application file for complete search history.

(56) References Cited

U.S. PATENT DOCUMENTS

| | | | | |
|---|---|---|---|---|
| 5,517,242 | A | * | 5/1996 | Yamada et al. ............... 348/254 |
| 6,429,895 | B1 | * | 8/2002 | Onuki ................... 348/208.99 |
| 7,379,094 | B2 | * | 5/2008 | Yoshida et al. ......... 348/208.99 |
| 2003/0133035 | A1 | * | 7/2003 | Hatano ....................... 348/362 |
| 2004/0119876 | A1 | | 6/2004 | Ohmori et al. |
| 2004/0207734 | A1 | * | 10/2004 | Horiuchi .................. 348/229.1 |

FOREIGN PATENT DOCUMENTS

| WO | WO 02/076090 A1 | 9/2002 |
|---|---|---|
| WO | WO 2004/030348 A1 | 4/2004 |

* cited by examiner

*Primary Examiner*—James M Hannett
(74) *Attorney, Agent, or Firm*—Drinker Biddle & Reath LLP

(57) ABSTRACT

Provided is a method of controlling a digital photographing apparatus that performs exposure in response to a photographing command signal and captures an image. The method includes (a) capturing an image of at least a first field using a smaller amount of exposure than a reference amount of exposure; (b) capturing an image of at least a second field using a larger amount of exposure than the reference amount of exposure; and (c) synthesizing the images of the at least first and second fields.

20 Claims, 12 Drawing Sheets

US 7,538,802 B2

METHOD OF CONTROLLING DIGITAL PHOTOGRAPHING APPARATUS TO INCREASE BRIGHTNESS DETECTABLE RANGE AND DIGITAL PHOTOGRAPHING APPARATUS ADOPTING THE METHOD

CROSS-REFERENCE TO RELATED PATENT APPLICATIONS

This application claims the priority of Korean Patent Application No. 10-2004-0072085, filed on Sep. 9, 2004, in the Korean Intellectual Property Office, the disclosure of which is incorporated herein in its entirety by reference.

BACKGROUND OF THE INVENTION

1. Field of the Invention

The present invention relates to a method of controlling a digital photographing apparatus and a digital photographing apparatus adopting the method, and more particularly, to a method of controlling a digital photographing apparatus that performs exposure in response to a photographing command signal and captures an image, and a digital photographing apparatus adopting the method.

2. Description of the Related Art

One example of a conventional digital photographing apparatus is disclosed in U.S. Patent Publication No. 2004/0119,876 entitled "Method of Notification of Inadequate Picture Quality". In this disclosure, the conventional digital photographing apparatus performs exposure and captures an image in response to a photographing command signal generated by a user.

In the conventional digital photographing apparatus, a photoelectric conversion unit (OEC) of a charge coupled device or a complementary metal oxide (CMOS) semiconductor has a brightness detectable range in which incident brightness can be detected.

FIG. 1 is a graph showing a brightness detectable range $R_{D1}$ of a conventional digital photographing apparatus. Referring to FIG. 1, the brightness detectable range $R_{D1}$ is defined as a difference between two incident brightness $B_{U1}$ and $B_{L1}$ that correspond to the lower limit value $N_{TH}$ for the number of detected cells.

In this case, since the bright detectable range $R_{D1}$ of the OEC of the conventional digital photographing apparatus is limited, a brightness range in which a photographing operation can be performed cannot be increased.

SUMMARY OF THE INVENTION

The present invention provides a method of controlling a digital photographing apparatus, which can increase a brightness range for performing a photographing operation although a brightness detectable range of a photoelectric conversion unit of the digital photographing apparatus is limited, and a digital photographing apparatus using the method.

According to an aspect of the present invention, there is provided a method of controlling a digital photographing apparatus that performs exposure in response to a photographing command signal and captures an image. The method includes (a) capturing an image of at least a first field using a smaller amount of exposure than a reference amount of exposure; (b) capturing an image of at least a second field using a larger amount of exposure than the reference amount of exposure; and (c) synthesizing the images of the at least first and second fields.

In the method, the lowest brightness that is detectable in the image of the first field is lower than the lowest brightness that is detectable in an image obtained using the reference amount of exposure because the lowest detectable brightness is decreased when an image is captured using a smaller amount of exposure.

Conversely, if the highest brightness that is detectable in the image of the at least second field is higher than the highest brightness that is detectable in the image obtained using the reference amount of exposure because the highest detectable brightness is increased when an image is captured using a larger amount of exposure. Therefore, when the images of the first and second fields are synthesized the brightness range within which a photographing operation can be performed can be increased.

According to another aspect of the present invention, there is provided a digital photographing apparatus adopting the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 2:
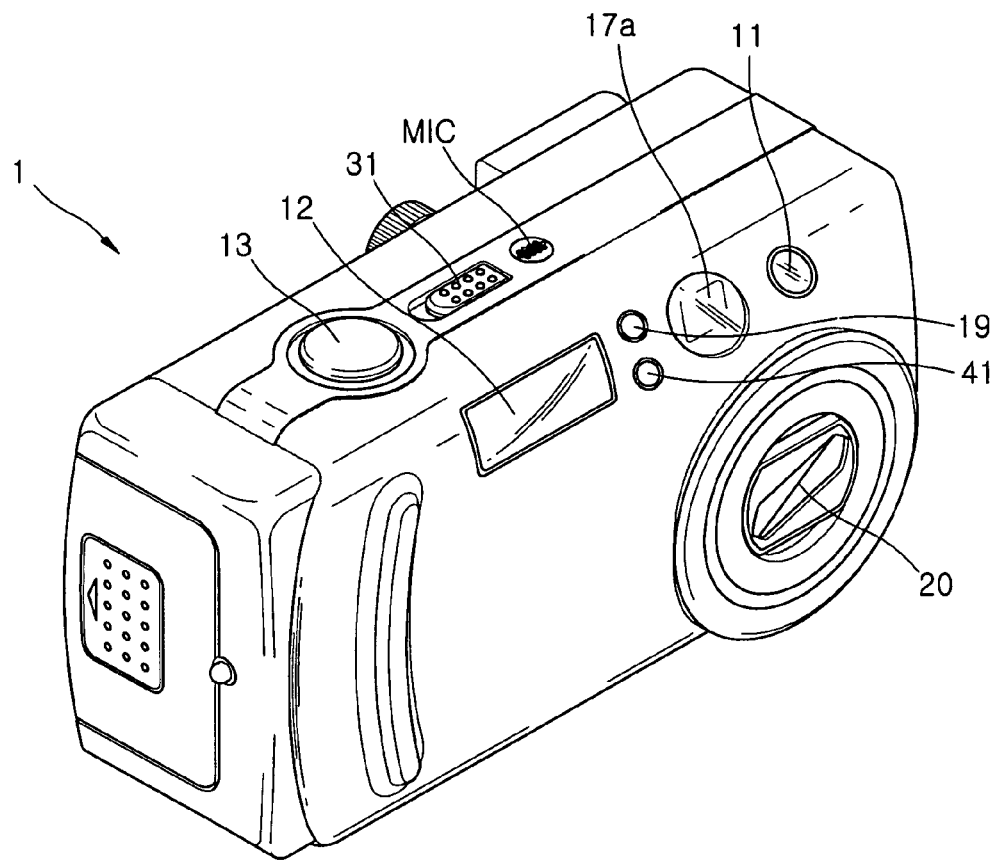
FIG. 2 is a perspective view illustrating the front and the top of a digital camera according to an aspect the present invention.

Referring to FIG. 2, the front part of a digital camera 1 according to an aspect of the present invention includes a microphone MIC, a self-timer lamp 11, a flash 12, a shutter release button 13, a viewfinder 17a, a flash light intensity sensor 19, a power switch 31, a lens unit 20, and a remote receiver 41.

In a self-timer mode, the self-timer lamp 11 operates for a set period of time from the time when the shutter release button 13 is pressed to the time when an image starts to be captured. When the flash 12 operates, the flash light intensity sensor 19 senses the intensity of the light generated by the flash 12 and relays the sensed intensity of the light to a digital camera processor (DCP) 507 of FIG. 3 via a micro-controller 512 of FIG. 3. The remote receiver 41 receives command signals, for example, a photographing command signal, from a remote controller (not shown) and relays the photographing command signal to the DCP 507 via the micro-controller 512.

The shutter release button 13 has two levels. In other words when a user depresses the shutter release button 13 to a first level a first level signal SH1 from the shutter release button 13 is turned on. When the user further depresses the shutter release button 13 to a second level a second level signal SH2 from the shutter release button 13 is turned on.

Figure 3:
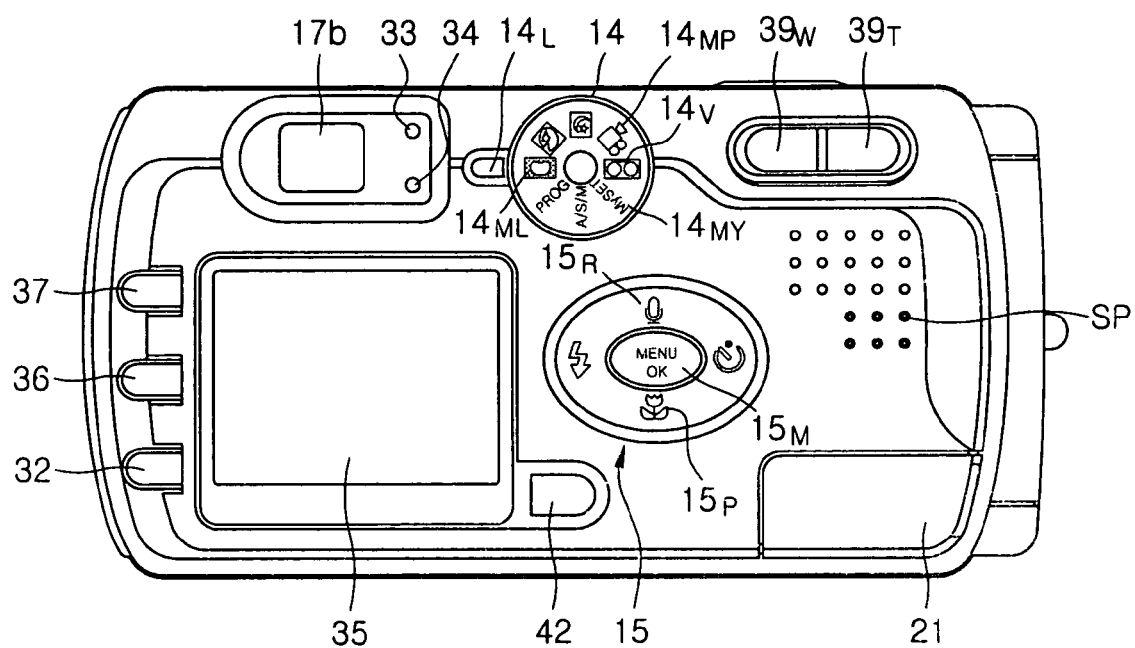
FIG. 3 is a perspective view illustrating the back of the digital camera of FIG. 2.

Referring now to FIG. 3, the back of the digital camera 1 of FIG. 2 is illustrated. As shown, the digital camera 1 includes a mode dial 14, functional buttons 15, a manual focus/delete button 36, a manual adjust/reproduce button 37, a reproduction mode button 42, a speaker SP, a monitor button 32, an automatic focusing lamp 33, a viewfinder 17b, a flash standby lamp 34, a color LCD panel 35, a wide angle-zoom button $39_W$, a telephoto-zoom button $39_T$, and an external interface unit 21.

The mode dial 14 is used for selecting and setting the operating modes of the digital camera 1, such as a synthesized photographing mode $14_{ML}$, a program photographing mode, a character photographing mode, a night view photographing mode, a manual photographing mode, a moving-image photographing mode $14_{MP}$, a user-setting mode $14_{MY}$, and a recording mode $14_V$.

The synthesized photographing mode $14_{ML}$ is for synthesizing an input image and a supporting image. The user-setting mode $14_{MY}$ is an operating mode where a user decides photograph-taking settings for a still-image or moving-image photographing mode. The recording mode $14_V$ is for recording only sounds, for example, a user's voice.

The functional buttons 15 are used for operating specific functions of the digital camera 1 and the functional buttons 15 are also used as control buttons to manage the movement of an active cursor that is displayed with a menu screen on the color LCD panel 35.

For example, a user may set automatic proximity focusing by pressing a macro/down button $15_P$. Also, after selecting a specific option from a menu/select-confirm button $15_M$, the user can move the cursor down by pressing the macro/down button $15_P$.

When the user presses a voice-memo/up button $15_R$, 10-second recording is possible upon consecutive photographing. Also, after selecting a specific option from the menu/select-confirm button $15_M$, the user can move the cursor up by pressing the voice-memo/up button $15_R$. If the user presses the menu/select-confirm button $15_M$ when the active cursor is on a menu item, an operation corresponding to the menu item is performed.

The manual focus/delete button 36 is used for manually focusing or deleting in a photographing mode. The manual adjust/reproduce button 37 is used for manual adjustment of specified conditions and for stopping or reproducing in the reproduction mode. The reproduction mode button 42 is used for switching the operation of the digital camera 1 between the reproduction mode and preview mode.

The monitor button 32 is used for controlling the operation of the color LCD panel 35. For example, in the photographing mode, when the user presses the monitor button 32, an image and photographing information are displayed on the color LCD panel 35. When the user presses the monitor button 32 again, the color LCD panel 35 is turned off. In the reproduction mode, when the user presses the monitor button 32 while an image file is being reproduced, photographing information about the image file is displayed on the color LCD panel 35. When the user presses the monitor button 32 again, only pure images are displayed.

The automatic focusing lamp 33 operates when focus is well adjusted. The flash standby lamp 34 operates when the flash 12 is in a standby mode. A mode indicating lamp $14_L$ indicates a selection mode of the mode dial 14.

Figure 4:
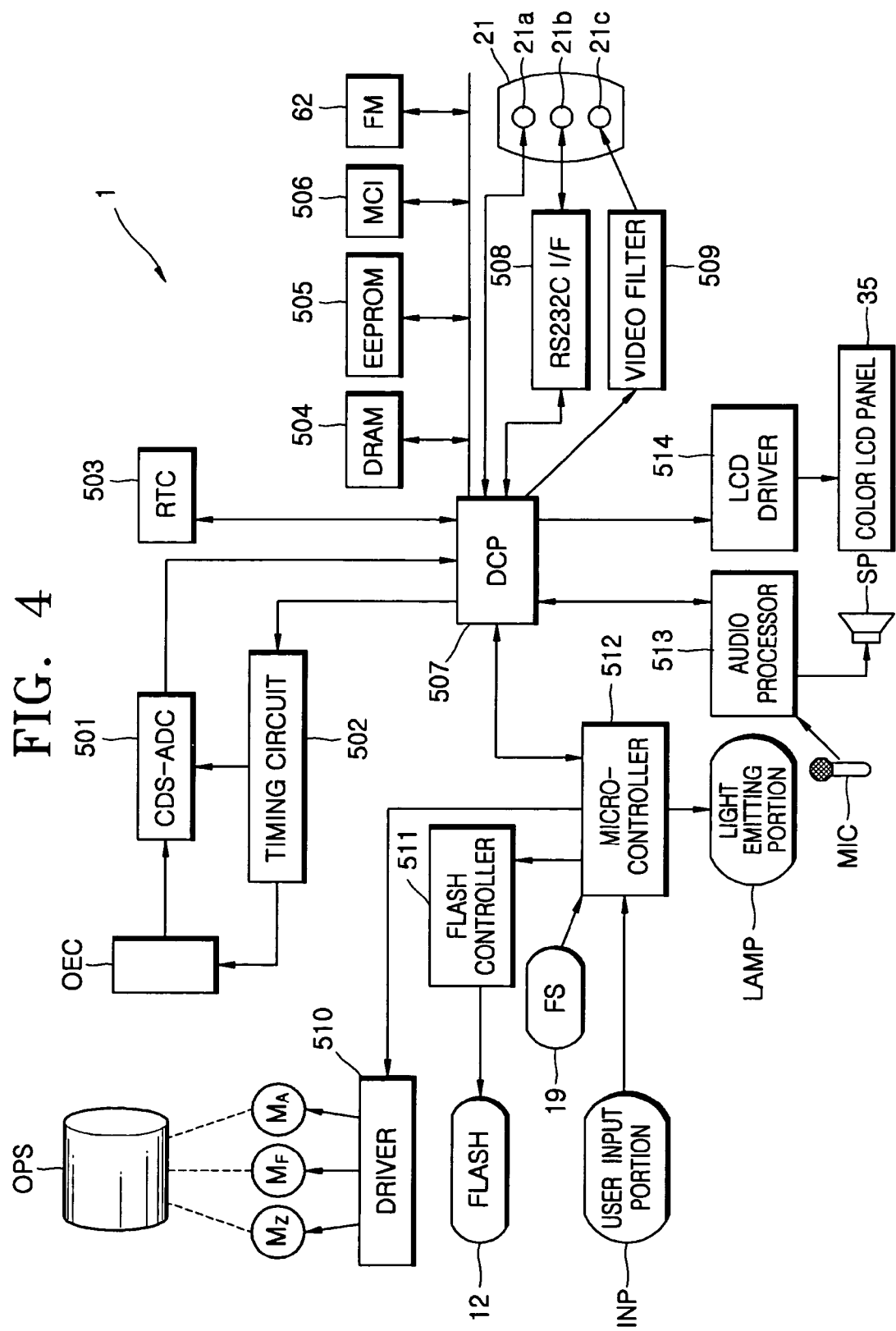
FIG. 4 is a block diagram for the digital camera of FIGS. 2 and 3.
Figure 5:
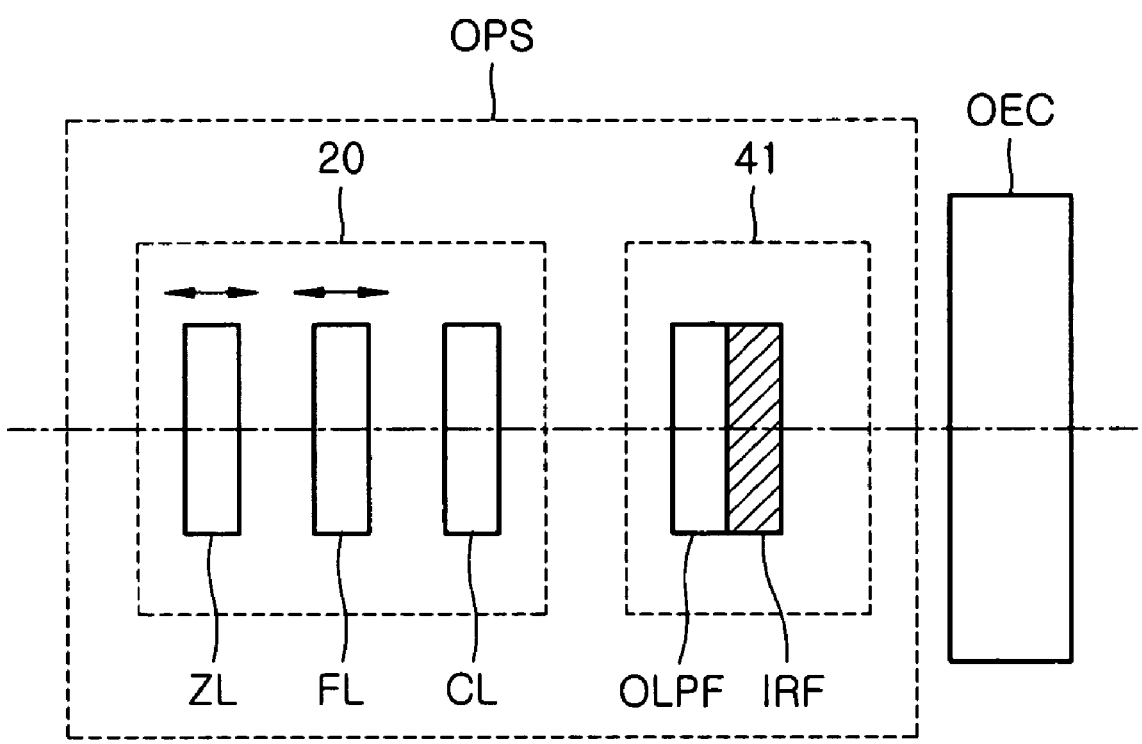
FIG. 5 illustrates an example optical system for the digital camera of FIGS. 2-4.

FIG. 4 is an example block diagram illustrating components of the digital camera 1 of FIGS. 2 and 3 and FIG. 5 illustrates an example optical system. The operation of the example digital camera 1 of FIGS. 2 and 3 will be described below with reference to FIGS. 2 through 5.

As shown in FIG. 5, an optical system (OPS) including the lens unit 20 and a filter unit 41 optically processes light. The lens unit 20 of the OPS includes a zoom lens ZL, a focal lens FL, and a compensation lens CL.

When the user presses the wide angle-zoom button $39_W$ or the telephoto-zoom button $39_T$ included in a user input portion (INP), a signal corresponding to the wide angle-zoom button $39_W$ or the telephoto-zoom button $39_T$ is relayed to the micro-controller 512. The micro-controller 512 controls a driver 510, thereby running a zoom motor $M_Z$, which in turn, moves the zoom lens ZL. In other words, when the user presses the wide angle-zoom button $39_W$, the focal length of the zoom lens ZL becomes short, thereby widening the angle of view. When the user presses the telephoto-zoom button $39_T$, the focal length of the zoom lens ZL becomes long, thereby narrowing the angle of view. Since the position of the focal lens FL is adjusted in a state where the position of the zoom lens ZL is set, the angle of view is hardly affected by the position of the focal lens FL.

In the automatic focusing mode, a main controller built into the DCP 507 controls the driver 510 through the micro-controller 512, thereby driving a focus motor $M_F$. Accordingly, when the focal lens FL is moved, the position of the focal lens FL, for example, a number of driving steps of the focus motor $M_F$, having a largest high frequency component of an image signal is set.

The compensation lens CL in the lens unit 20 of the OPS is not separately operated because the compensation lens CL compensates for the entire refractive index. Reference numeral $M_A$ indicates a motor for driving an aperture (not shown).

An optical low pass filter (OLPF) included in the filter unit 41 of the OPS eliminates high frequency optical noise. An infrared cut filter (IRF) included in the filter unit of the OPS blocks the infrared component of incident light.

A photoelectric conversion unit (OEC) of a charge coupled device or a complementary metal oxide (CMOS) semiconductor converts light from the OPS into an analog electrical signal. Here, the DCP 507 controls a timing circuit 502 to control the operations of the OEC and a correlation-double-sampler-and-analog-to-digital converter (CDS-ADC) 501. The CDS-ADC 501 processes an analog signal from the OEC, eliminates high frequency noise, adjusts amplitude, and then converts the analog signal into a digital signal.

A real time clock (RTC) 503 provides time information to the DCP 507. The DCP 507 processes the digital signal from the CDS-ADC 501 and generates a digital image composed of luminance and chromaticity values.

A light emitting portion (LAMP) is operated by the micro-controller 512 in response to a control signal generated by the DCP 507 including the main controller. The light emitting portion (LAMP) includes the self-timer lamp 11, the automatic focusing lamp 33, the mode indicating lamp $14_L$, and the flash standby lamp 34. The INP includes the shutter release button 13, the mode dial 14, the functional buttons 15, the monitor button 32, the manual focus/delete button 36, the manual adjust/reproduce button 37, the wide angle-zoom button $39_W$, and the telephoto-zoom button $39_T$.

A dynamic random access memory (DRAM) 504 temporarily stores a digital image signal from the DCP 507. An electrically erasable and programmable read only memory (EEPROM) 505 stores algorithms and setting data. A user's memory card is inserted or removed in a memory card interface (MCI) 506. A flash memory (FM) 62 stores setting data required to operate the DCP 507. The setting data includes data of supporting images for a synthesized photographing operation.

The digital image signal from the DCP 507 is input to an LCD driver 514, thereby displaying an image on the color LCD panel 35.

The digital image signal from the DCP 507 can be transmitted via a universal serial bus (USB) connector 21a or via an RS232C interface 508 and an RS232C connector 21b for serial communications. The digital image signal from the DCP 507 can also be transmitted via a video filter 509 and a video output unit 21c as a video signal.

An audio processor 513 can relay sound from the microphone MIC to the DCP 507 or to speaker SP. In addition, the audio processor 513 can output an audio signal from the DCP 507 to the speaker SP. The micro-controller 512 controls the operation of a flash controller 511 in response to a signal from the flash light intensity sensor 19, thereby driving the flash 12.

Figure 6:
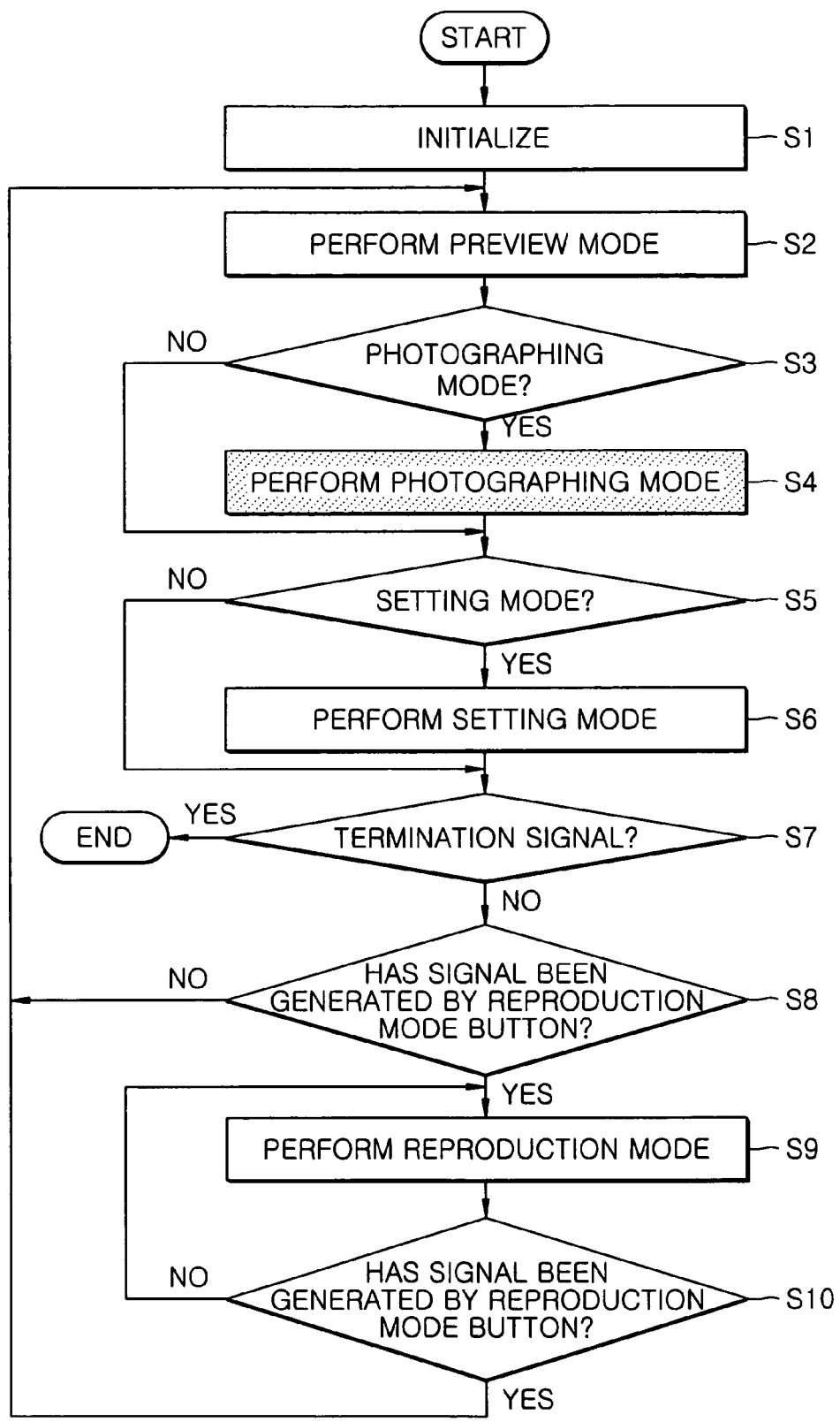
FIG. 6 is a flowchart illustrating a main algorithm of a digital camera processor (DCP) of FIG. 4.

FIG. 6 is a flowchart illustrating a main algorithm of the DCP 507 of FIG. 4. The main algorithm of the DCP 507 will be described below with reference to FIGS. 2 through 6.

When power is applied to the digital camera 1, the DCP 507 is initialized (S1). After the initialization (S1), the DCP 507 performs the preview mode (S2). In the preview mode, an input image is displayed on the color LCD panel 35. An operation related to the preview mode will be described in detail later with reference to FIG. 7.

When the first level signal SH1 from the shutter release button 13 is on (S3), the DCP 507 performs the photographing mode (S4). The photographing mode (S4) algorithm will be described in detail later with reference to FIG. 8.

When INP generated signals corresponding to a setting mode are input (S5), a setting mode for setting an operating condition in response to the input signals from the INP is performed (S6). When a termination signal is not generated at step S7 the DCP 507 continues to perform the following operations.

When a signal is generated (S8) by the reproduction mode button 42 of the INP the reproduction mode is performed (S9). In the reproduction mode (S9), operating conditions are set in response to the input signals from the INP and the reproduction operation is performed. When a signal is generated by the reproduction mode button 42 again (S10) the above operations (S2-S10) are repeated.

Figure 7:
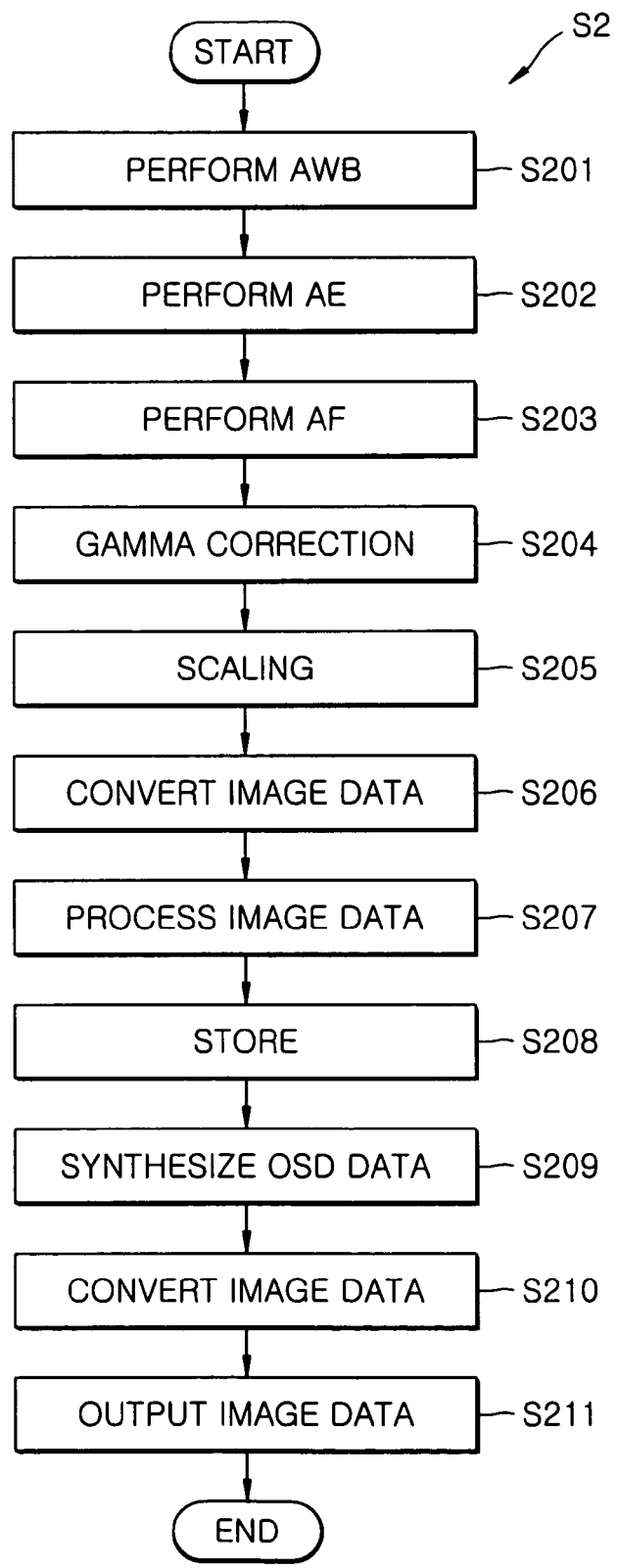
FIG. 7 is a flowchart illustrating a preview mode algorithm of FIG. 6.

FIG. 7 illustrates the preview mode (S2) algorithm of FIG. 6. The preview mode (S2) algorithm will now be described with reference to FIGS. 2 through 4 and FIG. 7.

The DCP 507 performs automatic white balancing (AWB) and sets parameters related to the white balance (S201). In the automatic exposure (AE) mode (S202), the DCP 507 calculates the exposure by measuring incident luminance, drives the aperture driving motor MA according to the calculated exposure, and controls the exposure time of the shutter (S203).

The DCP 507 performs gamma correction on input image data (S204) and scales the gamma corrected image data to meet display standards (S205). The DCP 507 converts the scaled input image data from an RGB (red, green, and blue) format into a luminance-chromaticity format (S206). The DCP 507 processes the input image data depending on resolution and where the input image data is displayed, and filters the input image data (S207).

The DCP 507 temporarily stores the input image data in the DRAM 504 of FIG. 4 (S208). The DCP 507 synthesizes the data temporarily stored in the DRAM 504 of FIG. 4 and on-screen display (OSD) data (S209). The DCP 507 converts the synthesized image data from the RGB format into the luminance-chromaticity format (S210) and outputs the image data in the converted format via the LCD driver 514 of FIG. 4 (S211).

Figure 8:
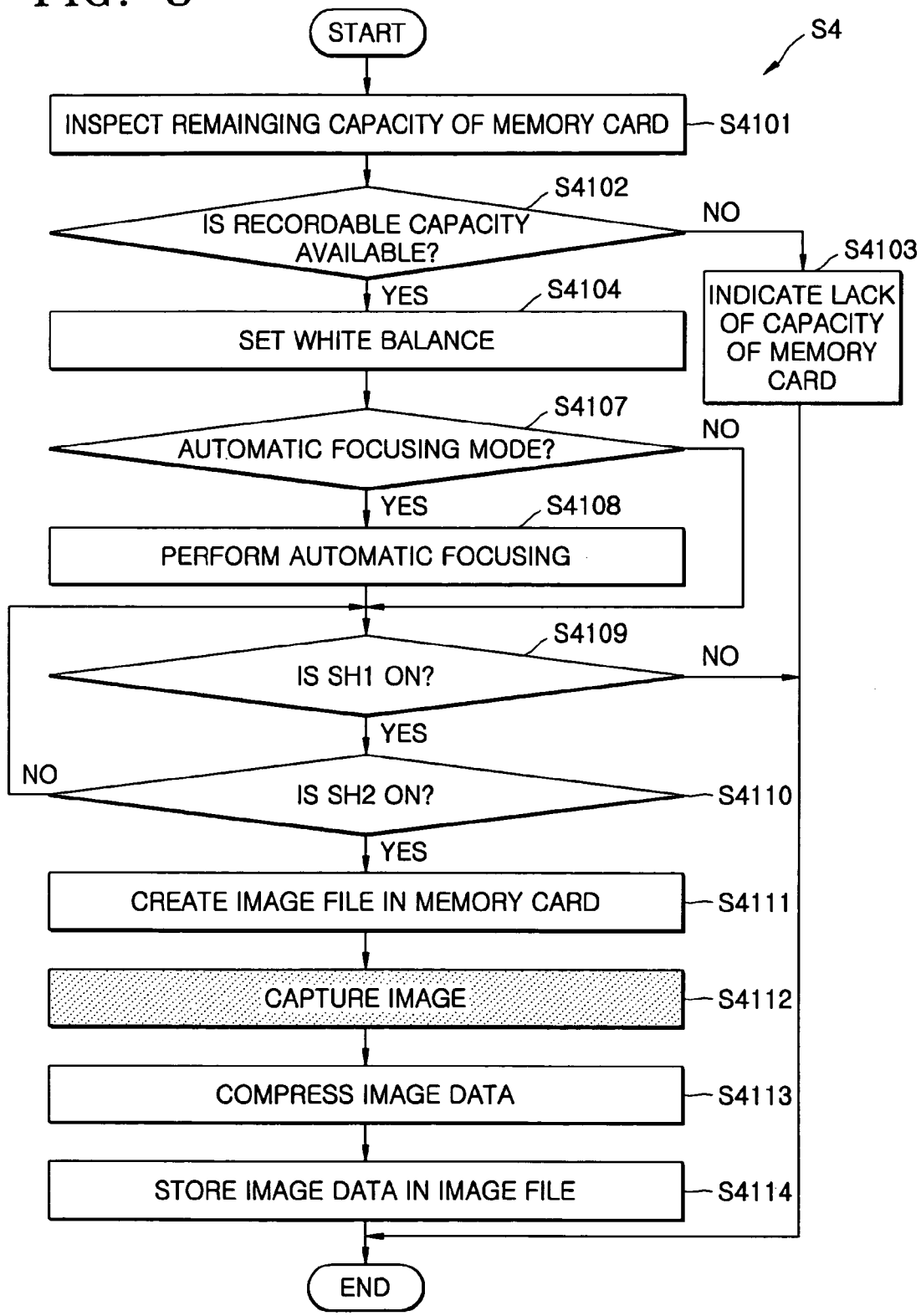
FIG. 8 is a flowchart illustrating a photographing mode algorithm of FIG. 6.

FIG. 8 illustrates the photographing mode (S4) algorithm of FIG. 6. The photographing mode (S4) algorithm will be described with reference to FIGS. 2 through 4 and 8. The photographing mode algorithm starts when the first level signal S1 from the shutter release button 13 is turned on. Here, the current position of the zoom lens ZL is already set.

The DCP 507 inspects the remaining recording space in the memory card (S4101) and determines whether the memory card has enough space for recording a digital image signal (S4102). When the memory card does not have enough recording space, the DCP 507 indicates the lack of space of the memory card and terminates the photographing mode (S4103). When the memory card has enough recording space, the following operations are performed.

The DCP 507 sets white balance according to a present photographing condition and sets parameters related to the white balance (S4104). In the automatic focusing mode (S4107), the DCP 507 performs automatic focusing and drives the focal lens FL (S4108). When the first level signal SH1 from the shutter release button 13 is on (S4109) the DCP 507 performs the following operations.

The DCP 507 identifies whether the second level signal SH2 is on (S4110). When the second level signal SH2 is not on, it means that the user did not press the shutter release button 13 to the second level to take a photograph. Then, the DCP 507 repeats operations S4109 through S4110.

When the second level signal SH2 is on, it means that the user depressed the shutter release button 13 to the second level. The DCP 507 creates an image file in the memory card (S4111). Next, the DCP 507 captures an image (S4112). In other words, the DCP 507 receives image data from the CDS-ADC 501. The operation of capturing an image will be described in detail later with reference to FIGS. 9 and 10. Then, the DCP 507 compresses the received image data (S4113). The DCP 507 stores the compressed image data in the image file (S4114).

Figure 1:
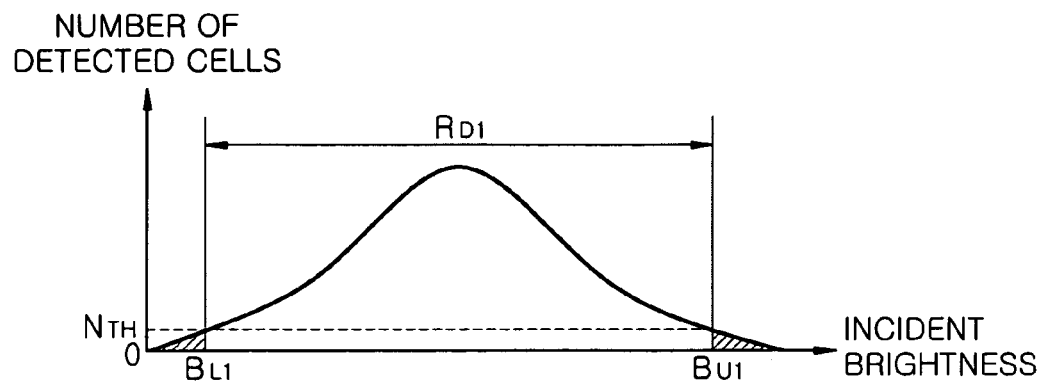
FIG. 1 is a graph showing a brightness detectable range of a conventional digital photographing apparatus.
Figure 9:
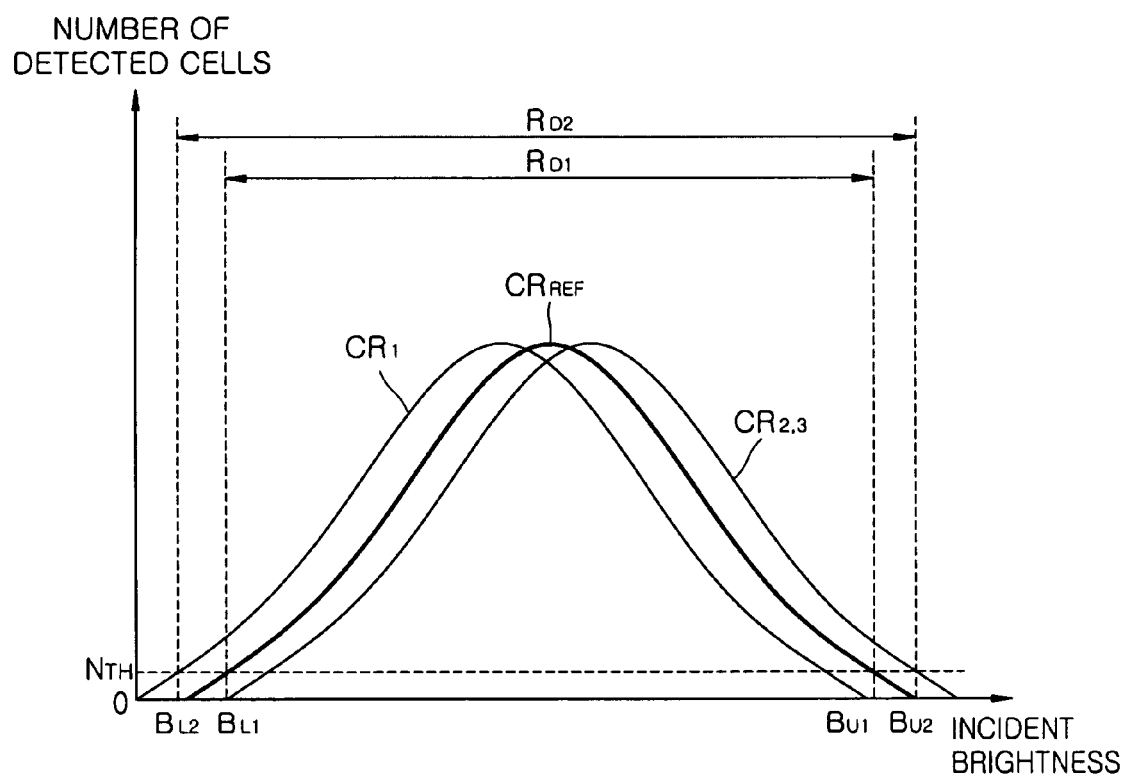
FIG. 9 is a graph showing a brightness range obtained as a result of performing the operation of capturing an image of FIG. 8.
Figure 10:
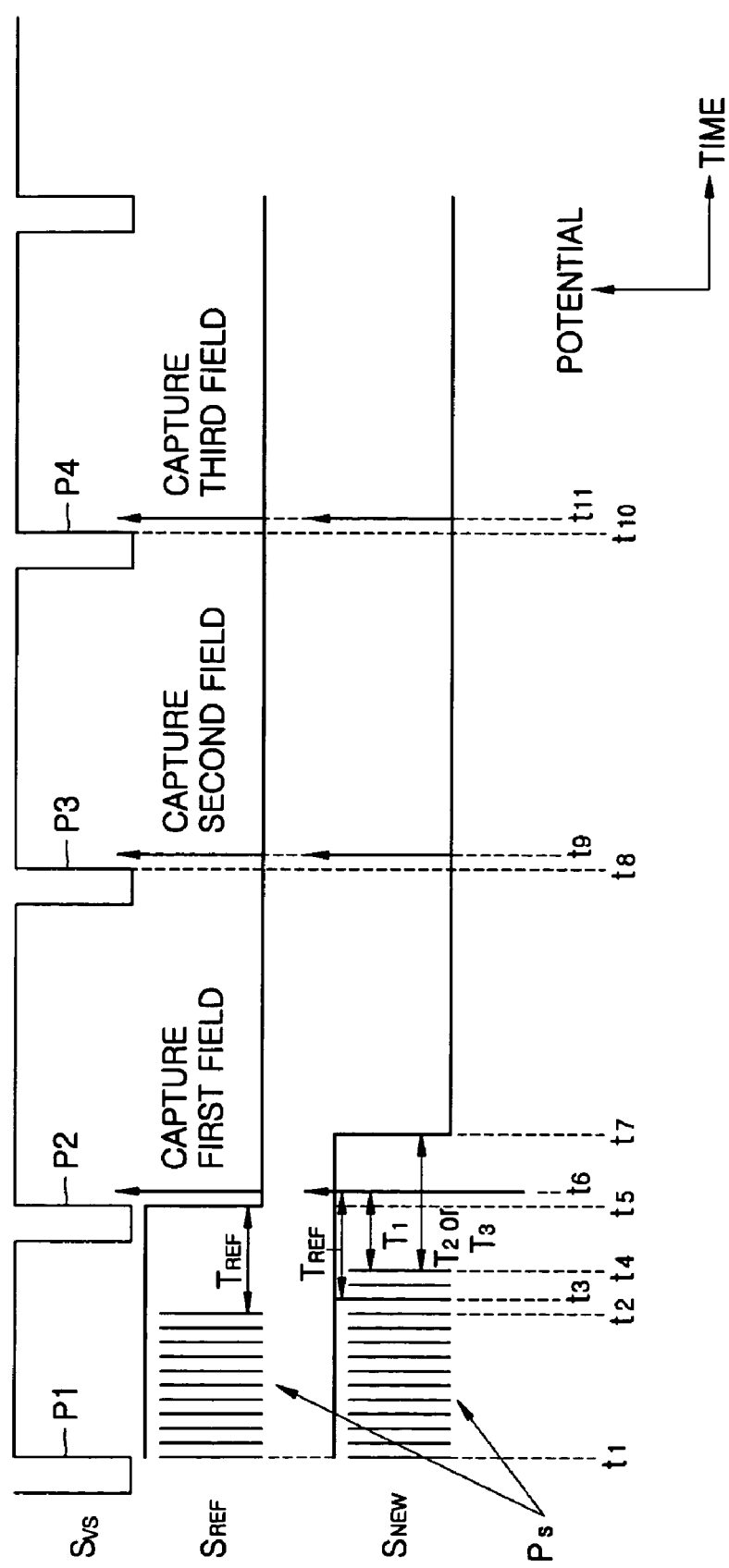
FIG. 10 is a timing diagram illustrating the operation of capturing an image of FIG. 8.
Figure 11:
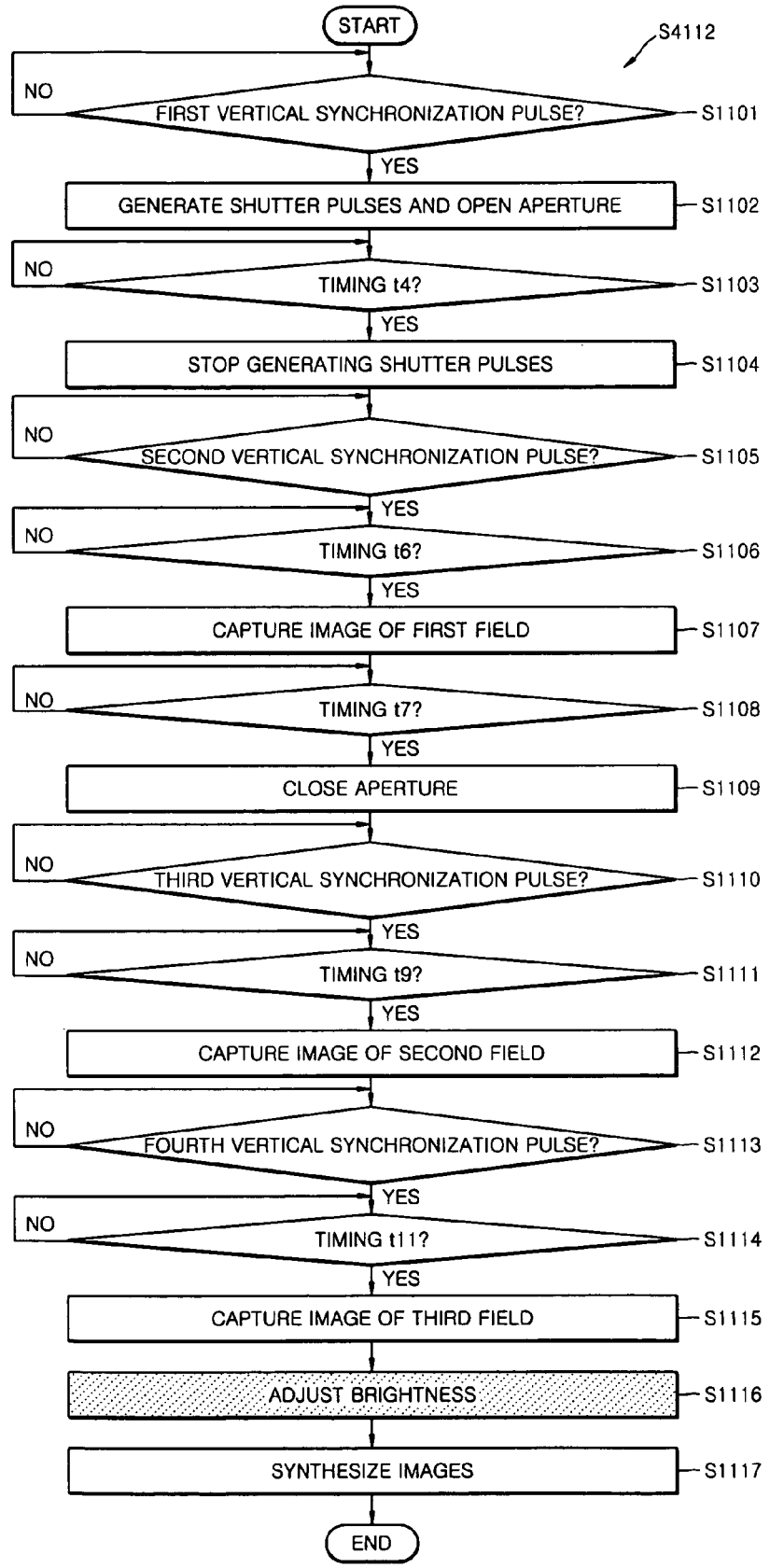
FIG. 11 is a flowchart illustrating the operation of capturing an image of FIG. 8.

FIG. 9 is a graph showing a brightness range $R_{D2}$ obtained as a result of performing the operation of capturing an image (S4112) of FIG. 8. Reference numerals in FIG. 9 identical to those in FIG. 1 denote identical elements. FIGS. 10 and 11 illustrate the operation of capturing an image (S4112) of FIG. 8.

In FIG. 10 that illustrates an example timing diagram for increasing a brightness detectable range, reference numeral $S_{VS}$ indicates a vertical synchronization signal, P1 through P4 indicate vertical synchronization pulses, $S_{REF}$ indicates a reference control signal for a reference exposure time, $S_{NEW}$ indicates a control signal in the operation of capturing an image (S4112) of FIG. 8, $T_{REF}$ indicates reference exposure time, $T_1$ indicates exposure time of a first field, $T_2$ indicates exposure time of a second field, and $T_3$ indicates exposure time of a third field.

The operation of capturing an image (S4112) of FIG. 8 will now be described with reference to FIGS. 4 and 9 through 11.

As can be appreciated from FIGS. 10 and 11, when a first vertical synchronization pulse P1 is generated (S1101), the DCP 507 generates shutter pulses $P_S$ and opens the aperture (S1102). At timing t4 for terminating pulse generation (S1103), the DCP 507 stops generating the shutter pulses $P_S$ (S1104). Accordingly, light is incident to the OEC after timing t4.

At timing t6 after a second vertical synchronization pulse P2 is generated at timing t5 (S1105 and S1106), the DCP 507 controls the timing circuit 502 to capture an image of the first field from the CDS-AGC 501 (S1107). In FIG. 10, the time period between t2 and t3 is the same as the time period between t5 and t6. Thus, the exposure time $T_1$ of the first field is shorter than the reference exposure time $T_{REF}$ by the time period between t3 and t4.

At timing t7, the DCP 507 controls the micro-controller 512 to close the aperture (S1108 and S1109). At timing t9 after a third vertical synchronization pulse P3 is generated at timing t8 (S1110 and S1111), the DCP 507 controls the timing circuit 502 to capture an image of the second field from the CDS-AGC 501 (S1112). At timing t11 after a fourth vertical synchronization pulse P4 is generated at timing t10 (S1113 and S1114), the DCP 507 controls the timing circuit 502 to capture an image of the third field from the CDS-AGC 501 (S1115). In FIG. 10, the time period between t6 and t7 is set to twice the time period between t3 and t4. Thus, the exposure time $T_2$ or $T_3$ of the second field or the third field is longer than the reference exposure time $T_{REF}$ by the time period between t3 and t4.

The average brightness of the image of the first field is lower than an average reference brightness and the average brightness of the image of the second or third field is higher than the average reference brightness. Thus, to make the average brightness of the images of the first through third fields the same, the average brightness of the image of the first field needs to be increased whereas the average brightness of the images of the second and third fields needs to be lowered. Accordingly, the DCP 507 adjusts brightness as described above (S1116). The operation of adjusting brightness (S1116) will be described in detail later with reference to FIGS. 12 and 13. Finally, the DCP 507 synthesizes the images of the first through third fields (S1117).

Referring now to FIG. 9, when a characteristic curve $CR_1$ of the image of the first field is compared with a characteristic curve $CR_{REF}$ of an image obtained using a reference amount of exposure it is seen that the lowest brightness $B_{L2}$ that is detectable in the image of the first field is lower than the lowest brightness $B_{L1}$ that is detectable in the image obtained using the reference amount of exposure. This is because the lowest detectable brightness is decreased when an image is captured using a smaller amount of exposure.

Conversely, when characteristic curves $CR_{2,3}$ of the images of the second and third fields are compared with the characteristic curve $CR_{REF}$ of the image obtained using the reference amount of exposure, the highest brightness $B_{U2}$ that is detectable in the images of the second and third fields is higher than the highest brightness $B_{U1}$ that is detectable in the image obtained using the reference amount of exposure. This is because the highest detectable brightness is increased when an image is captured using a larger amount of exposure. Now, when the images of the first through third fields are synthesized the brightness range $R_{D2}$ within which a photographing operation can be performed is increased as shown.

Figure 12:
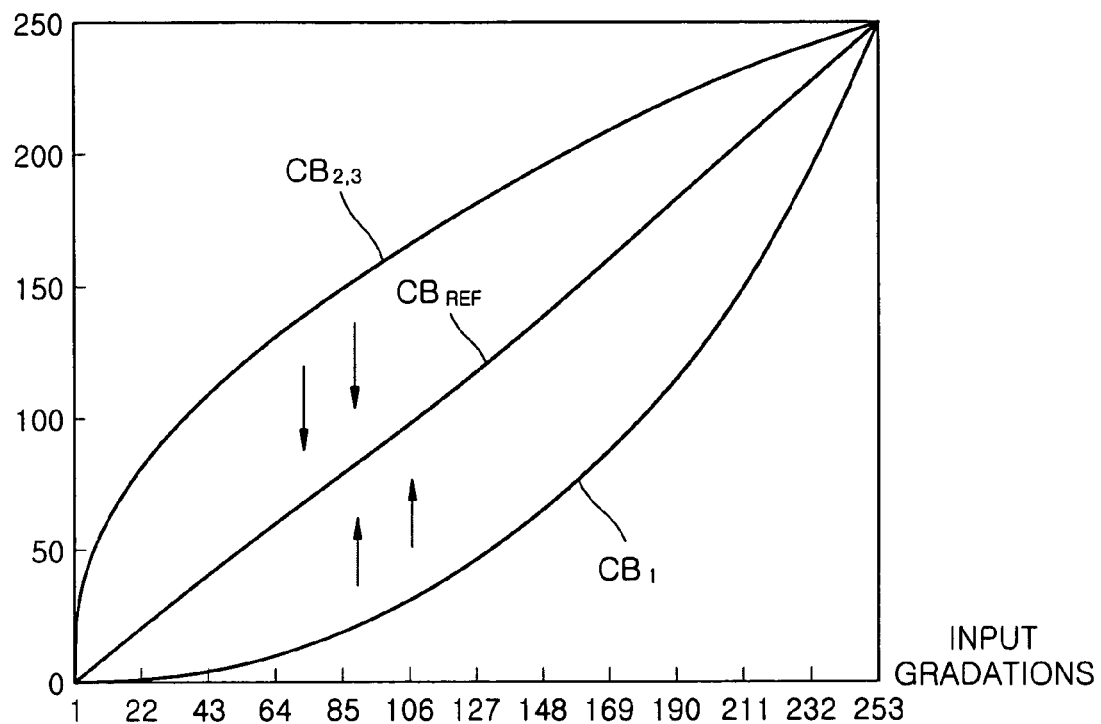
FIG. 12 is a graph illustrating the operation of adjusting brightness of FIG. 11.

FIG. 12 is a graph illustrating the operation of adjusting brightness (S1116) of FIG. 11. In FIG. 12 $CB_1$, $CB_{REF}$, and $CB_{2,3}$ indicate characteristic curves of normalized output brightness that are obtained experimentally with respect to input gray-scales. Here, $CB_1$ indicates a characteristic curve of the first field that is obtained with a smaller amount of exposure than the reference amount of exposure, $CB_{REF}$ indicates a characteristic curve of a reference field that is obtained with the reference amount of exposure, and $CB_{2,3}$ indicates characteristic curves of the second and third fields that are obtained with a larger amount of exposure than the reference amount of exposure.

As shown in FIG. 12, the average brightness of the image of the first field is lower than the reference average brightness and the average brightness of the second or third field is higher than the reference average brightness. Thus, to make the average brightness of the images of the first through third fields the same, the average brightness of the image of the first field needs to be increased whereas the average brightness of the images of the second and third fields needs to be decreased.

To this end the EEPROM 505 stores correction lookup tables for correcting data of the images of the first through third fields.

Figure 13:
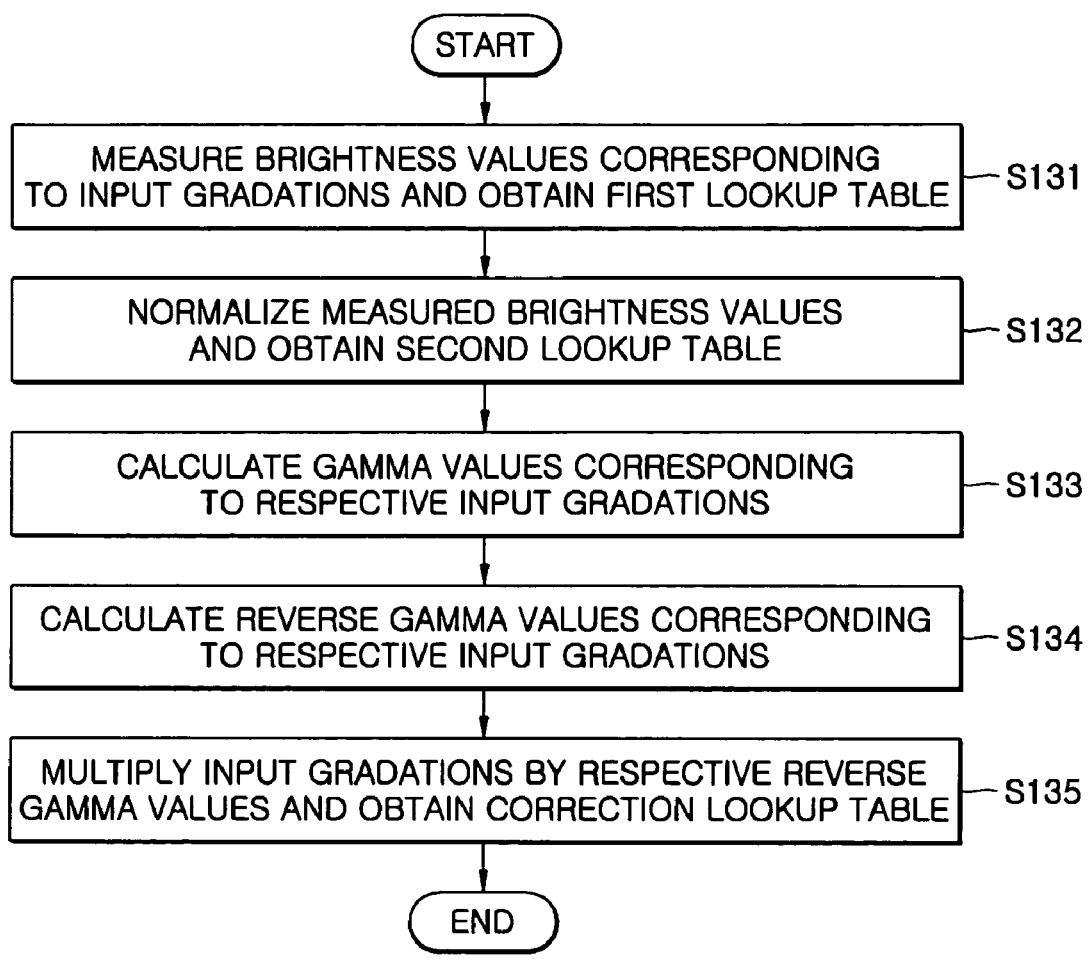
FIG. 13 is a flowchart illustrating the operations for obtaining correction lookup tables that are used in the operation of adjusting brightness of FIG. 11.

A process of obtaining correction lookup tables used in the operation of adjusting brightness (S1116) of FIG. 11 will now be described with reference to FIGS. 12 and 13. This process may be performed, for example, when manufacturing the digital camera 1.

Brightness values corresponding to input gray-scales are measured and a first lookup table is obtained (S131). The range of the measured brightness values is normalized to become the same as the range of the input gray-scales and a second lookup table is obtained (S132). In other words, the characteristic curve $CB_1$ of the first field or the characteristic curve $CB_{2,3}$ of the second and third fields corresponds to the second lookup table.

A gamma value γ corresponding to each of the input gray-scales in the second lookup table is calculated (S133). Here, each of the input gray-scales is gamma squared to produce normalized output brightness. In addition, a reverse gamma value 1/γ corresponding to each of the input gray-scales is calculated (S134). The input gray-scales are multiplied by the respective reverse gamma values 1/γ and a correction lookup table is obtained (S135).

The correction lookup table is stored in the EEPROM 505. Accordingly, the characteristic curves $CB_1$ and $CB_{2,3}$ of the first through third fields are corrected to become the same as the characteristic curve $CB_{REF}$ of the reference field with the reference amount of exposure. Thus, linearity can be enhanced in addition to adjusting brightness.

As described above, according to a digital photographing apparatus and a method of controlling the same, a brightness range in which a photographing operation can be performed can be increased by synthesizing images of first and second fields obtained using different amounts of exposure.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital photographing apparatus that performs exposure in response to a photographing command signal and captures an image, the method comprising:

(a) capturing an image of a first field using a first exposure (b) capturing an image of a second field using a second exposure, wherein the level of the second exposure is different from the level of the first exposure; and (c) synthesizing the images of the first and second fields,
wherein the first exposure is executed for a first exposure duration shorter than a reference exposure duration and the second exposure is executed for a second exposure duration that adds the first exposure duration to a predetermined duration to be longer than the reference exposure duration, and
wherein the first exposure duration and the second exposure duration are started together.

2. The method of claim 1 wherein the first exposure level is less than a reference exposure level.

3. The method of claim 1 wherein the second exposure level is greater than a reference exposure level.

4. The method of claim 2 wherein the second exposure level is greater than both of the first exposure level and the reference exposure level.

5. The method of claim 1 wherein step (a) comprises:
generating a first synchronization pulse relative to the photographing command signal;
generating a first group of sequential shutter pulses by the first synchronization pulse;
generating a second synchronization pulse at a predetermined time after the first synchronization pulse; and
capturing the image of the first field having the first exposure level corresponding to the first exposure duration after the second synchronization pulse.

6. The method of claim 5 wherein step (b) comprises:
generating a third synchronization pulse at a predetermined time after the second synchronization pulse; and
capturing the image of the second field having the second exposure level corresponding to the second exposure duration after generating the third synchronization pulse,
wherein the first exposure duration and the second exposure duration are started together at the time of stopping the generating the first group of sequential shutter pulses.

7. The method of claim 1 wherein the synthesizing step comprises:
normalizing an average brightness value of the image of the first field to an average brightness value of a reference image; and
normalizing an average brightness value of the image of the second field to the average brightness value of the reference image.

8. The method of claim 7 wherein the normalizing steps are performed relative to a correction lookup table that is stored in a memory of the digital photographing apparatus.

9. A method of controlling a digital photographing apparatus that performs exposure in response to a photographing command signal and captures an image, the method comprising:
(a) capturing an image of a first field using a smaller exposure than a reference exposure;
(b) capturing an image of a second field using a larger exposure than the reference exposure;
(c) adjusting an average brightness of the image of the first field and an average brightness of the image of the second field; and
(d) synthesizing the images of the first and second fields,
wherein the smaller exposure is executed for a first exposure duration shorter than a reference exposure duration and the larger exposure is executed for a second exposure duration that adds the first exposure duration to a predetermined duration to be longer than the reference exposure duration, and
wherein the first exposure duration and the second exposure duration are started together.

10. The method of claim 9 wherein step (a) comprises:
generating a first synchronization pulse relative to the photographing command signal;
generating a first group of sequential shutter pulses by the first synchronization pulse;
generating a second synchronization pulse at a predetermined time after the first synchronization pulse;
capturing the image of the first field having the smaller exposure corresponding to a first exposure duration shorter than a reference exposure duration.

11. The method of claim 10 wherein step (b) comprises:
generating a third synchronization pulse at a predetermined time after the second synchronization pulse; and
capturing the image of the second field having the larger exposure corresponding to a second exposure duration longer than the reference exposure duration,
wherein the first exposure duration and the second exposure duration are started together at the time of stopping the generating the first group of sequential shutter pulses.

12. The method of claim 9 wherein the adjusting step comprises:
normalizing an average brightness value of the image of the first field to an average brightness value of a reference image; and
normalizing an average brightness value of the image of the second field to the average brightness value of the reference image.

13. The method of claim 12 wherein the normalizing steps are performed relative to a correction lookup table that is stored in a memory of the digital photographing apparatus.

14. The method of claim 9 wherein the adjusting step comprises:
compensating for the image of the first field such that a first brightness characteristic relative to the first field becomes generally linear; and
compensating for the image of the second field such that a second brightness characteristic relative to the second field becomes substantially collinear with the first brightness characteristic.

15. A digital photographing apparatus comprising:
an optical system including an aperture;
a photoelectric conversion unit in optical communication with the aperture for receiving a light reflected from a subject and creating an image signal according to the light;
a processor linked with the aperture and the photoelectric conversion unit for controlling opening and closing of the aperture and for storing an image file based on the image signal; and
a memory linked with the processor, wherein the memory stores at least one lookup table for increasing a brightness detectable range of the photoelectric conversion unit,
wherein the processor controls the aperture and the photoelectric conversion unit by the method comprising:
(a) capturing an image of a first field using a first exposure;
(b) capturing an image of a second field using a second exposure, wherein the level of the second exposure is different from the level of the first exposure; and
(c) synthesizing the images of the first and second fields,
wherein the first exposure is executed for a first exposure duration shorter than a reference exposure duration and the second exposure is executed for a second exposure duration that adds the first exposure duration to a predetermined duration to be longer than the reference exposure duration, and wherein the first exposure duration and the second exposure duration are started together.

16. The digital photographing apparatus of claim 15 wherein the processor further comprises a means for timing first and second exposure durations during which the aperture is opened, wherein the first exposure duration is shorter than a reference exposure duration for providing an underexposed image of the subject and the second exposure is longer than the reference exposure duration for providing an overexposed image of the subject.

17. The digital photographing apparatus of claim 16 wherein the processor further comprises a synthesizing means for combining the underexposed image and the overexposed image relative to the lookup table.

18. The digital photographing apparatus of claim 15 wherein the processor comprises at least one of a digital camera processor and a micro-controller.

19. The digital photographing apparatus of claim 18 wherein the memory comprises an EEPROM.

20. The digital photographing apparatus of claim 19 wherein the photoelectric converter comprises one of a charge coupled device and a CMOS semiconductor.

* * * * *